US012756233B2

(12) United States Patent
Huang et al.

(10) Patent No.: US 12,756,233 B2
(45) Date of Patent: Oct. 6, 2026

(54) WIRELESS CHARGING BASE AND CHARGING SYSTEM OF AUTOMATIC SNOW SWEEPING EQUIPMENT

(71) Applicant: SHENZHEN HANYANG TECHNOLOGY CO., LTD., Shenzhen (CN)

(72) Inventors: Yang Huang, Shenzhen (CN); Taotao Zhu, Shenzhen (CN); Yongqi Song, Shenzhen (CN); Hanfeng Wei, Shenzhen (CN)

(73) Assignee: SHENZHEN HANYANG TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/562,535

(22) Filed: Mar. 10, 2026

(65) Prior Publication Data

US 2026/0200358 A1 Jul. 16, 2026

Related U.S. Application Data

(63) Continuation of application No. 18/726,792, filed as application No. PCT/CN2023/130532 on Nov. 8, 2023.

(30) Foreign Application Priority Data

Oct. 7, 2023 (CN) ......................... 202311299166.3
Oct. 7, 2023 (CN) ......................... 202322679617.8

(51) Int. Cl.
*B60L 53/36* (2019.01)
*B60L 53/12* (2019.01)
(Continued)

(52) U.S. Cl.
CPC ............... *B60L 53/36* (2019.02); *B60L 53/12* (2019.02); *B60L 53/37* (2019.02); *B60L 53/39* (2019.02); *B60L 2200/40* (2013.01); *E01H 5/098* (2013.01)

(58) Field of Classification Search
USPC .......................................................... 320/108
See application file for complete search history.

(56) References Cited

U.S. PATENT DOCUMENTS

2018/0014709 A1 1/2018 O'Brien et al.
2025/0368087 A1* 12/2025 Han, Sr. .................. B60L 53/68

FOREIGN PATENT DOCUMENTS

CN 106300578 A 1/2017
CN 106809036 A 6/2017
(Continued)

OTHER PUBLICATIONS

International Search Report and Written Opinion for PCT Application No. PCT/CN2023/130532, dated May 30, 2024. (10 pages).

*Primary Examiner* — Mohammed Alam
(74) *Attorney, Agent, or Firm* — ASHURST PERKINS COIE US LLP

(57) ABSTRACT

Provided are a wireless charging base and a charging system of automatic snow sweeping equipment. The wireless charging base comprises a mounting component and a charging component, an upper end face of the mounting component and a support surface of the wireless charging base are oppositely arranged at a preset included angle, or, the upper end face of mounting component has a first side and a second side, and the distance between the upper end face and the support surface gradually increases from the first side to the second side, so as to be suitable for automatic snow sweeping equipment to move from the first side to the second side.

20 Claims, 9 Drawing Sheets

(51) Int. Cl.

| | |
|---|---|
| ***B60L 53/37*** | (2019.01) |
| ***B60L 53/39*** | (2019.01) |
| ***E01H 5/09*** | (2006.01) |

(56) References Cited

FOREIGN PATENT DOCUMENTS

| | | | | | |
|---|---|---|---|---|---|
| CN | 208808382 | U | | 5/2019 | |
| CN | 209104903 | U | | 7/2019 | |
| CN | 110353574 | A | | 10/2019 | |
| CN | 111146826 | A | | 5/2020 | |
| CN | 111419119 | A | | 7/2020 | |
| CN | 211377608 | U | | 8/2020 | |
| CN | 115844286 | A | | 3/2023 | |
| CN | 115912685 | A | | 4/2023 | |
| WO | 2020094014 | A1 | | 5/2020 | |
| WO | 2021254338 | A1 | | 12/2021 | |
| WO | WO-2023160575 | A1 | * | 8/2023 | .............. H02J 7/663 |
| WO | 2025073128 | A1 | | 4/2025 | |

* cited by examiner

WIRELESS CHARGING BASE AND CHARGING SYSTEM OF AUTOMATIC SNOW SWEEPING EQUIPMENT

CROSS-REFERENCE TO RELATED APPLICATION(S)

The application is a continuation of and claims priority to and benefits of U.S. application Ser. No. 18/726,792 entitled "WIRELESS CHARGING BASE AND CHARGING SYSTEM OF AUTOMATIC SNOW SWEEPING EQUIPMENT," filed on Jul. 4, 2024, which is a national phase application of PCT Application No. PCT/CN2023/130532 entitled "WIRELESS CHARGING BASE AND CHARGING SYSTEM OF AUTOMATIC SNOW CLEARING DEVICE," filed on Nov. 8, 2023, which further claims the priority and benefit of Chinese Patent Application Nos. 202322679617.8 and 202311299166.3, both filed on Oct. 7, 2023. The contents of each of the above-referenced patent applications are hereby incorporated by reference as part of the disclosure of the document.

TECHNICAL FIELD

The application relates to the technical field of wireless charging base, in particular to a wireless charging base and a charging system of automatic snow sweeping equipment.

BACKGROUND

With the rapid development of science and technology, automatic snow sweeping equipment has become a commonly used snow sweeping tool in winter. In the spirit of low carbon and environmental protection, automatic snow sweeping equipments are usually electric.

SUMMARY

An embodiment of the present application provides a wireless charging base, used for charging an automatic snow sweeping equipment, the wireless charging base includes a mounting component and a charging component; the charging component is arranged on the mounting component and used for charging the automatic snow sweeping equipment; an upper end face of the mounting component and a support surface of the wireless charging base are oppositely arranged at a preset included angle, so as to be suitable for the automatic snow sweeping equipment to move from a low position to a high position of the upper end face; or the upper end face of the mounting component has a first side and a second side, and the first side and second side are opposite; a distance between the upper end face and the support surface of the wireless charging base gradually increases from the first side to the second side, so as to be suitable for the automatic snow sweeping equipment to move from the first side to the second side.

Another embodiment of the present application further provides a wireless charging base, used for charging an automatic snow sweeping equipment; the wireless charging base includes a mounting component and a charging component, the charging component is arranged on the mounting component, and the charging component is used for charging the automatic snow sweeping equipment; a minimum height of the upper end face of the mounting component relative to a support surface of the wireless charging base is not greater than 10 mm.

Another embodiment of the present application further provides a wireless charging base, used for charging an automatic snow sweeping equipment; the wireless charging base includes a mounting component and a charging component, the charging component is arranged on the mounting component, and the charging component is used for charging the automatic snow sweeping equipment; and the mounting component is embedded and fixed at a preset position of ground, and a minimum height of an upper end face of the mounting component relative to the ground is not greater than 10 mm, so that the automatic snow sweeping equipment is able to move from an unscheduled position of the ground to the preset position without raising its head.

Another embodiment of the present application further provides a wireless charging base, used for charging an automatic snow sweeping equipment; the wireless charging base includes a mounting component and a charging component, the charging component is arranged on the mounting component, and the charging component is used for charging the automatic snow sweeping equipment; and the mounting component is embedded and fixed at a preset position of ground, and an upper end face of the mounting component is flat with the ground, so that the automatic snow sweeping equipment is able to move from an unscheduled position of the ground to a preset position without raising its head.

Another embodiment of the present application further provides a wireless charging base, which includes a mounting component, a charging component and a transition piece, the charging component is arranged on the mounting component, the mounting component is used to charge an automatic operation equipment or an automatic snow sweeping equipment; the transition piece is arranged at a front side of the mounting component, the transition piece is suitable for guiding the automatic operation equipment or automatic snow sweeping equipment to move from the transition piece to the mounting component; and the transition piece is detachably connected with the mounting component.

Another embodiment of the present application further provides a charging system of automatic snow sweeping equipment, including an automatic snow sweeping equipment and the wireless charging base of any one of the above embodiments, the wireless charging base is used for charging the automatic snow sweeping equipment.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

Figure 1:
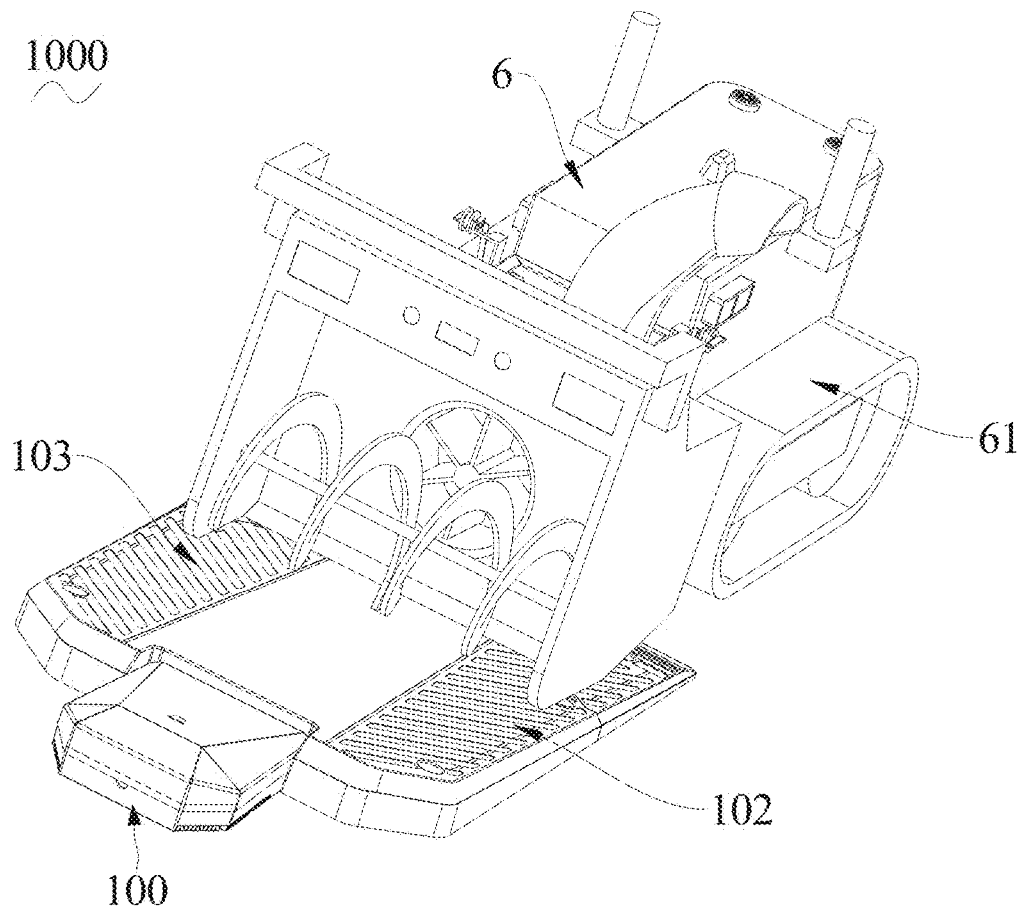
FIG. 1 is a structural schematic diagram of a charging system according to an embodiment of the present application.

Reference signs in the drawings are as follows.

1—Mounting component; 100—Wireless charging base; 1000—Charging system; 101—Charging cavity; 1011—Upper end face; 1012—Support surface; 1013—First side; 1014—Second side; 102—First support area; 103—Second support area; 104—Preset included angle; 105—Beacon area; 106—Positioning area; 11—Mounting body; 111—Mounting support part; 1111—Mounting pattern; 112—Mounting side edge part; 113—First dividing part; 114—Second dividing part; 12—Support body; 121—First support plate; 1211—Protrusion; 122—Charging support plate; 123—Second support plate; 124—Top plate support part; 125—Side edge support part; 13—Support mounting hole; 14—Groove; 15—Limit groove; 16—Limit protrusion; 17—Outer layer protrusion; 18—Inner layer protrusion; 180—Reinforcing rib; 150—Limit area; 160—Extension area; 2—Charging component; 200—Ground; 21—Transmitting coil; 22—Charging control piece; 221—Charging housing; 2211—Waterproof joint; 2212—Cooling beam; 222—Main charging control board; 223—Aviation plug; 3—Transition piece; 30—Upper end face; 31—Top transition plate part; 32—Transition side part; 321—First bevel; 322—Middle edge; 323—Second bevel; 33—Connecting protrusion; 34—Transition reinforcing rib; 35—Transition fixing hole; 36—Transition pattern; 361—First sub-Pattern; 362—Second sub-Pattern; 4—Beacon component; 41—First beacon inductance coil; 42—Second beacon inductance coil; 43—Third beacon inductance coil; 44—Cover plate; 441—Pressing plate; 5—Positioning component; 51—First positioning inductance coil; 52—Support block; 6—Automatic snow sweeping equipment; 60—Sensing component; 61—Crawler belt; 7—Stopper.

DETAILED DESCRIPTION

In order to facilitate the understanding of this application, the application will be described in more detail with the attached drawings and specific embodiments. Preferred embodiments of the present application are described with the drawings. However, this application may be implemented in many different forms and is not limited to the embodiments described in this specification. On the contrary, these embodiments are provided to make the disclosure of this application more thorough and comprehensive.

It should be noted that, unless otherwise defined, all technical and scientific terms used in this specification have the same meanings as commonly understood by those skilled in the art of this application. The terms used in the specification of this application is only for the purpose of describing specific embodiments, not intended to limit this application. The term “and/or” used in this specification includes any and all combinations of one or more related listed items.

For the description of this application, the labels “front”, “rear”, “upper”, “lower”, “left” and “right” shown in the drawings are used to facilitate the understanding of this embodiment, and are not intended to limit this application. The front-back direction indicates the longitudinal direction, the left-right direction indicates the transverse direction, and the up-and-down direction indicates the vertical direction.

When the automatic snow sweeping equipment of related technology is short of power, it needs to return to the wireless charging base for charging. The wireless charging base usually accumulates a lot of snow because it is located outdoors. At this case, the automatic snow sweeping equipment needs to clear the snow on the wireless charging base before charging. However, the wireless charging base is flat, and the minimum height of the wireless charging base is 35 mm, since the center of automatic snow sweeping equipment is in the front, the automatic snow sweeping equipment climbs the wireless charging base through a crawler belt for a certain distance, the automatic snow sweeping equipment would drop suddenly due to the action of gravity, which would easily hit the wireless charging base and accelerate the damage of the wireless charging base, and would also make the position of automatic snow sweeping equipment deviate, which would lead to the inaccurate positioning and affect the charging. When the automatic snow sweeping equipment hits the wireless charging base, the snow in front of the wireless charging base is not easy to be completely cleaned, and some snow will remain. The remaining snow is compacted by the automatic snow sweeping equipment, and the compacted snow forms ice cubes, which will raise the plane of wireless charging base, and then raise the automatic snow sweeping equipment, resulting in the inability of automatic snow sweeping equipment to charge.

Referring to FIG. 1, some embodiments of the present application provide a charging system 1000 of the automatic snow sweeping equipment 6. The charging system 1000 includes an automatic snow sweeping equipment 6 and a wireless charging base 100; the wireless charging base 100 is used to charge the automatic snow sweeping equipment 6.

Figure 2:
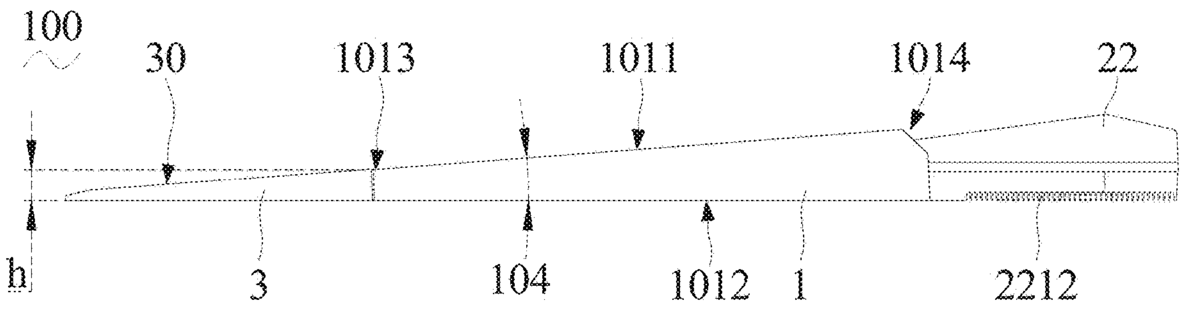
FIG. 2 is a schematic side view of a wireless charging base of FIG. 1 according to an embodiment of the present application.
Figure 3:
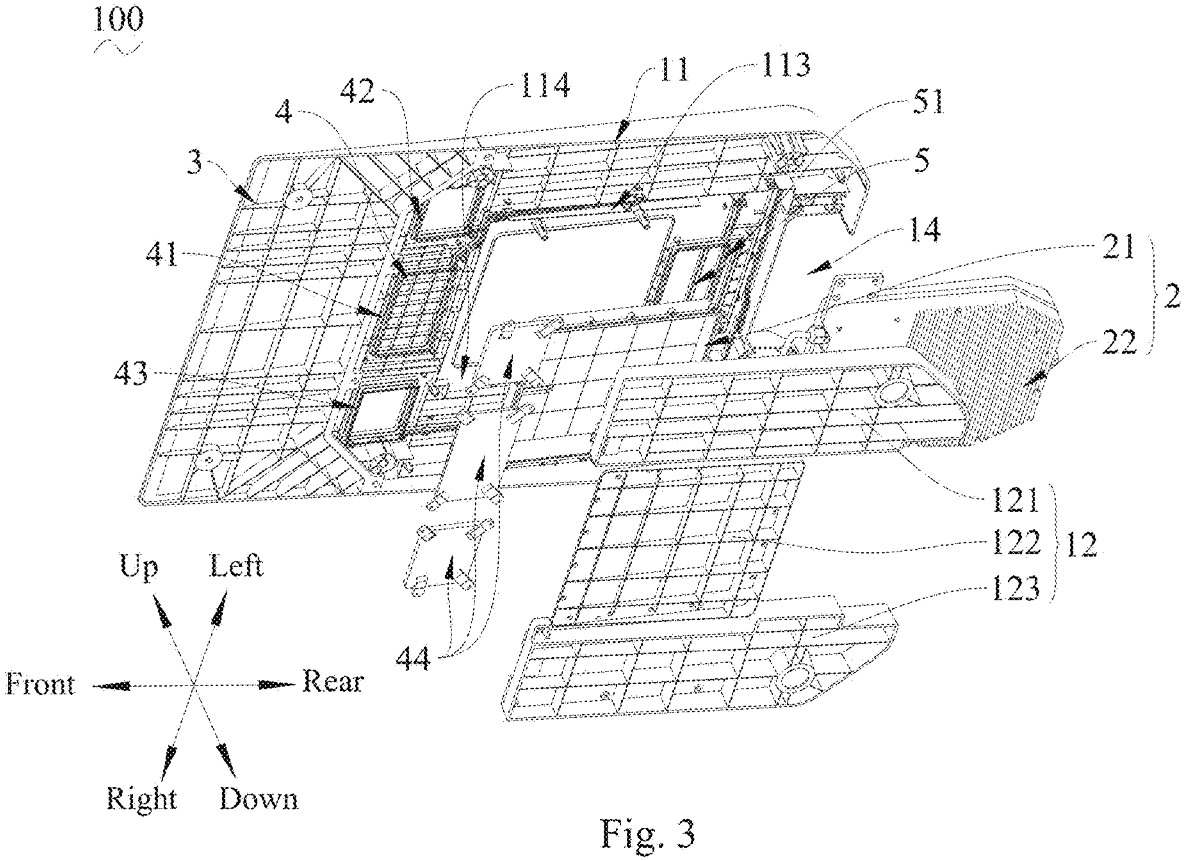
FIG. 3 is a structure exploded view of a wireless charging base according to an embodiment of the present application.

Referring to FIG. 2 and FIG. 3, the wireless charging base 100 includes a mounting component 1 and a charging component 2, and the charging component 2 is arranged on the mounting component 1 and used for charging the automatic snow sweeping equipment 6.

In some embodiments, an upper end face 1011 of the mounting component 1 and a support surface 1012 of the wireless charging base 100 are arranged oppositely at a preset included angle 104, so as to be suitable for the automatic snow sweeping equipment 6 to move from a low position to a high position of the upper end face 1011 of the mounting component 1. In this way, when the automatic snow sweeping equipment 6 enters the wireless charging base 100 to sweep snow, the snow on the wireless charging base 100 can be cleaned from the front end of the wireless charging base 100 (for example, the low position of the upper end face 1011 of the mounting component 1), and then smoothly enters the wireless charging base 100, so that the snow on the whole wireless charging base 100 can be completely cleaned, omission is unlikely to occur, thus reducing the frequency of manual intervention and improving the intelligence of the whole snow sweeping process.

In some embodiments, the upper end face 1011 of the mounting component 1 has a first side 1013 and a second side 1014, the distance between the upper end face 1011 and the support surface 1012 gradually increases from the first side 1013 to the second side 1014, so as to be suitable for the automatic snow sweeping equipment 6 to move from the first side 1013 to the second side 1014. In this way, it is helpful for the automatic snow sweeping equipment 6 to sweep snow when it enters the wireless charging base 100. The snow on the wireless charging base 100 can be cleaned from the front end of the wireless charging base 100 (for example, the first side 1013 of the upper end face 1011 of the mounting component 1), and then smoothly enters the wireless charging base 100, so that the snow on the whole wireless charging base 100 can be completely cleaned, omission is unlikely to occur, thus reducing the frequency of manual intervention and improving the intelligence of the whole snow sweeping process.

In some embodiments, the minimum height “h” of the upper end face 1011 of the mounting component 1 relative to the support surface 1012 of the wireless charging base 100 is less than 10 mm, so as to be suitable for the automatic snow sweeping equipment 6 to move from the first side 1013 to the second side 1014. In this way, the automatic snow sweeping equipment 6 can smoothly move from the first side 1013 to the second side 1014, without the sudden drop of the automatic snow sweeping equipment 6. This reduces the damage of automatic snow sweeping equipment 6 to wireless charging base 100, and improves the service life of wireless charging base 100. It also avoids the position error of the automatic snow sweeping equipment 6, improves the position accuracy of the automatic snow sweeping equipment 6, avoids the repositioning times and ensures that the charging is carried out.

In some embodiments, before the automatic snow sweeping equipment 6 is charged, the front of the automatic snow sweeping equipment 6 can first move into mounting component 1 from the first side 1013 to second side 1014 to clean the snow on the mounting component 1, then exit the mounting component 1, and then turn around to make the back side of the automatic snow sweeping equipment 6 retreat to the mounting component 1, so that the charging position on the automatic snow sweeping equipment 6 corresponds to charging component 2 for charging.

Ground is usually used as the support surface, which is usually horizontal. The front end of the upper end face 1011 of the mounting component 1 is first side 1013 and the back end is second side 1014.

In some embodiments, the preset included angle 104 between the upper end face 1011 of the mounting component 1 and the support surface 1012 of wireless charging base 100 is 0°-15°. For example, the preset included angle 104 may be 0°, 1°, 2°, 3°, 4°, 5°, 6°, 7°, 8°, 9°, 10°, 11°, 12°, 13°, 14°, 15° or any value between the above two adjacent angle values.

The preset included angle 104 should have a suitable angle range. If the angle is too large, the automatic snow sweeping equipment 6 would easily slide out of the mounting component 1, which would also increase the structural size of the mounting component 1 itself. It is also required that mounting component 1 itself has high structural strength to avoid the damage of mounting component 1, which would greatly increase the cost of mounting component 1. In some embodiments, when the upper end face 1011 of the mounting component 1 is set obliquely, the preset included angle 104 between the upper end face 1011 of the mounting component 1 and the support surface 1012 of wireless charging base 100 is 3°-8°, for example, the preset included angle 104 may be 5°.

When the preset included angle 104 is greater than 0, the upper end face 1011 of the mounting component 1 is an inclined plane with a certain inclination angle. In some embodiments, the height of the front-side mounting side edge 112 of the mounting component 1 is smaller than that of the rear-side mounting side edge 112, so that the front end of mounting support part 111 is lower and the back end is higher. For example, if the preset included angle 104 of the mounting support part 111 is preset to be 10°, and the length of the horizontal side of the mounting side edge 112 is 20 cm, the height of the front side of the mounting side edge 112 may be 0 cm, 1 cm and 2 cm, etc. And the corresponding heights of the rear side of the mounting side edge 112 are 3.5 cm, 4.5 cm and 5 cm. Thus ensuring that the preset included angle 104 of the mounting support part 111 is always 10°. Whether the preset included angle 104 of the mounting support part 111 is determined first or the heights of the front and rear sides of the mounting side edge 112 are determined first, the preset included angle 104 can be determined.

In some embodiments, as shown in FIG. 2, the minimum height “h” of the upper end face 1011 of the mounting component 1 relative to the support surface 1012 of the wireless charging base 100 is not greater than 10 mm. At this case, the upper end face 1011 of the mounting component 1 may be a plane, an inclined plane or an arc surface.

In some embodiments, the distance between the upper end of the first side 1013 and the support surface 1012 of the wireless charging base 100 is 0 mm to 9 mm, For example, the distance between the upper end of the first side 1013 and the support surface 1012 of the wireless charging base 100 may be 0 mm, 1 mm, 2 mm, 3 mm, 4 mm, 5 mm, 6 mm, 7 mm, 8 mm, 9 mm or any value between the above two adjacent distance values.

When the distance between the upper end of the first side 1013 and the support surface 1012 of the wireless charging base 100 is 0 mm and the preset included angle 104 is 0°, it indicates that the upper end face 1011 is parallel to the support surface 1012. The distance between the upper end of the first side 1013 and the support surface 1012 of the wireless charging base 100 is 0 mm, and when the preset included angle 104 is greater than 0°, it indicates that the first side 1013 is flush with the support surface 1012. The upper end face 1011 gradually increases from the beginning to the end, which also enables the automatic snow sweeping equipment 6 to smoothly enter the mounting component 1. When the distance between the upper end of the first side 1013 and the support surface 1012 of the wireless charging base 100 is more than 0 mm and less than 9 mm, and the preset included angle 104 is 0°, it indicates that the upper end face 1011 slightly protrudes from the support surface 1012. When the distance between the upper end of the first side 1013 and the support surface 1012 of the wireless charging base 100 is greater than 0 mm and less than 9 mm, and the preset included angle 104 is greater than 0°, it indicates that the first side 1013 of the upper end face 1011 slightly protrudes from the support surface 1012. The upper end face 1011 gradually increases from the beginning to the end, thereby enabling the automatic snow sweeping equipment 6 to move from an unscheduled position of the ground to a preset position without raising its head.

Figure 6:
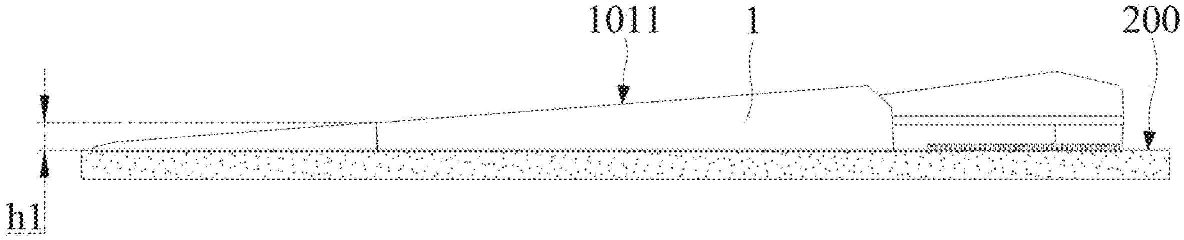
FIG. 6 is a structural schematic diagram of a side view of a wireless charging base according to another embodiment of the present application.

In some embodiments, as shown in FIG. 6, the mounting component 1 is embedded and fixed at a preset position of the ground 200, and the minimum height "h1" of the upper end face 1011 of the mounting component 1 relative to the ground 200 is not greater than 10 mm, for example, the minimum height "h1" may be 0 mm to 9 mm, so as to be suitable for the automatic snow sweeping equipment 6 to move from an unscheduled position of the ground 200 to the preset position without raising its head. At this case, the upper end face 1011 may be a plane, an inclined surface or an arc surface. Therefore, it can also be suitable for the automatic snow sweeping equipment 6 to move from an unscheduled position of the ground 200 to a preset position without raising its head.

Figure 7:
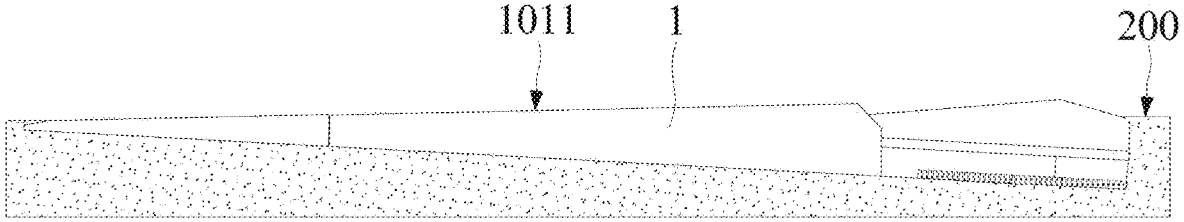
FIG. 7 is a structural schematic diagram of a side view of a wireless charging base according to another embodiment of the present application.

In some embodiments, as shown in FIG. 7, the mounting component 1 is embedded and fixed at a preset position of the ground 200, and the upper end face 1011 of the mounting component 1 is flat with the ground 200, so as to be suitable for the automatic snow sweeping equipment 6 to move from an unscheduled position of the ground 200 to the preset position without raising its head. When the upper end face 1011 of the mounting component 1 is parallel with the ground 200, it may be completely parallel or have an error of ±2 mm. Therefore, it is also possible for the automatic snow sweeping equipment 6 to move from an unscheduled position of the ground 200 to a preset position without raising its head.

By setting the preset included angle 104 and the distance between the upper end of the first side 1013 of the mounting component 1 and the support surface 1012 of the wireless charging base 100, it can not only make the mounting component 1 have proper size, ensure the mounting component 1 to have high structural strength, reduce the cost of the mounting component 1, but also facilitate the automatic snow sweeping equipment 6 to enter the mounting component 1 for snow sweeping and charging.

By defining the relationship between the upper end face 1011 and the support surface 1012 of the mounting component 1 in different embodiments, the automatic snow sweeping equipment 6 can move from the unscheduled position of the ground to the preset position without raising its head.

Figure 8:
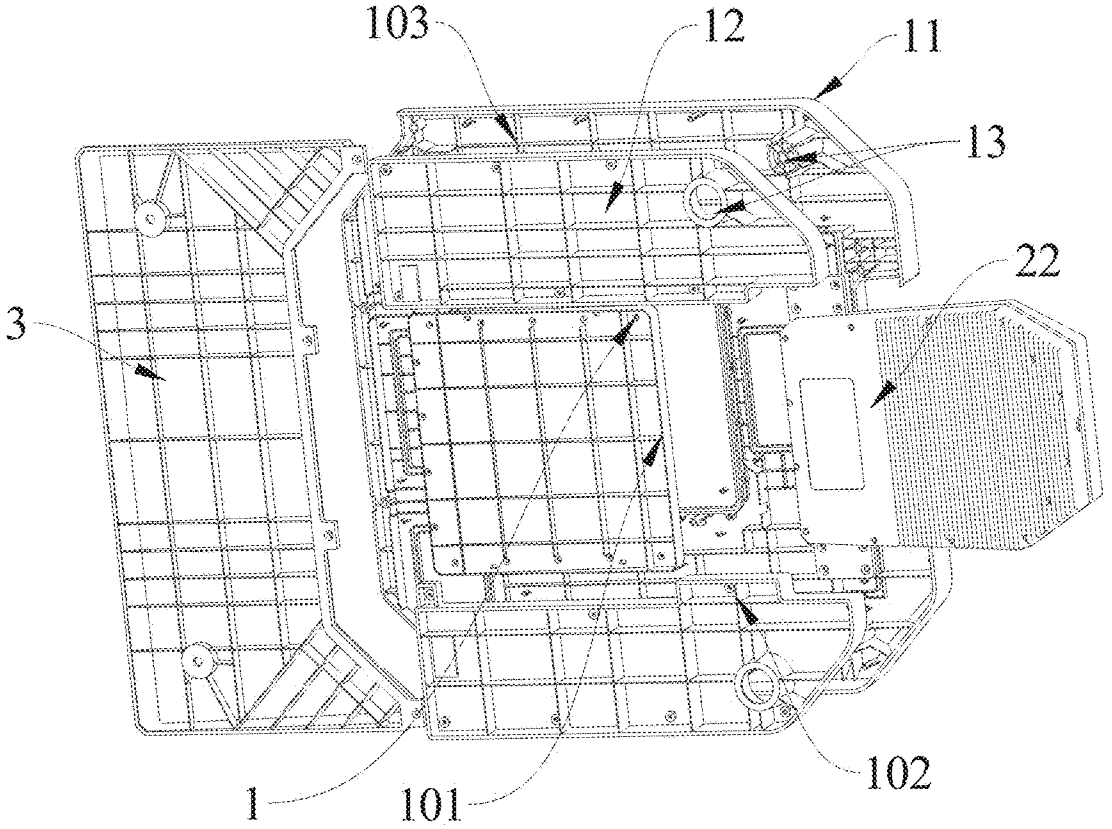
FIG. 8 is a partial structure exploded view of a wireless charging base from a perspective according to an embodiment of the present application.

As shown in FIG. 8, the mounting component 1 includes a mounting body 11 and a support body 12, and the mounting body 11 and the support body 12 are enclosed to form a charging cavity 101.

In some embodiments, the mounting body 11 may be a plate-like structure with a frame, and the support body 12 may be a plate-like structure, and the support body 12 covers the frame of the mounting body 11, thereby forming the charging cavity 101. In other embodiments, the support body 12 may also be a plate-like structure with a frame, and the mounting body 11 may be a plate-like structure, and the mounting body 11 covers the frame of the support body 12, thereby forming the charging cavity 101.

Figure 4:
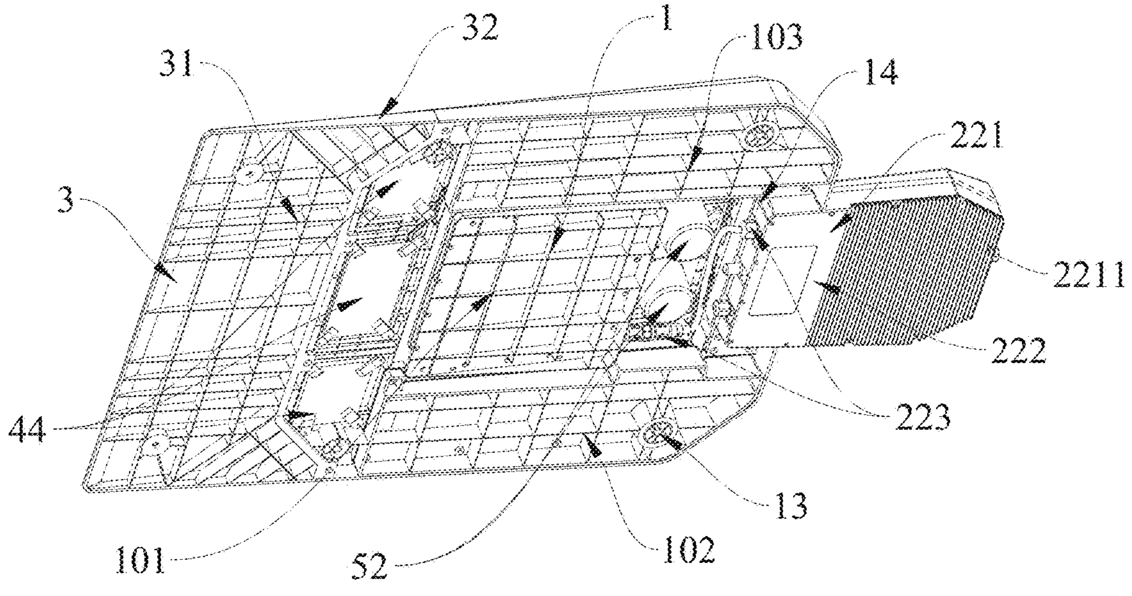
FIG. 4 is a structural schematic diagram of the bottom of a wireless charging base according to an embodiment of the present application.
Figure 5:
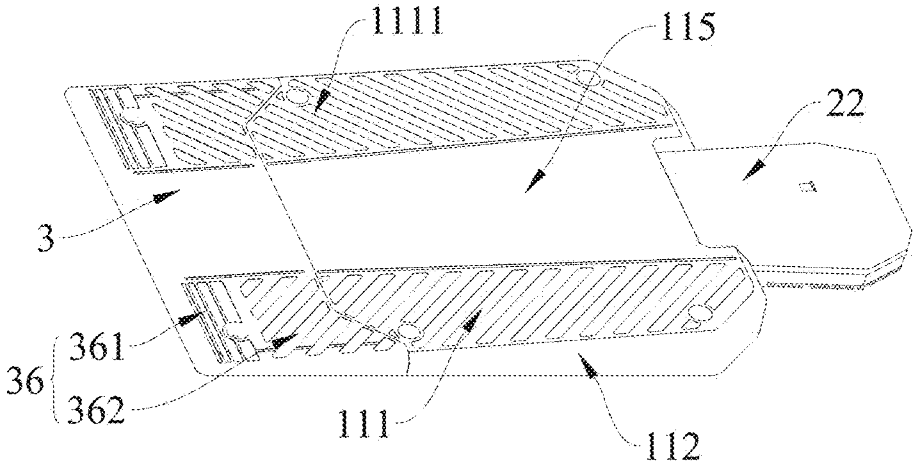
FIG. 5 is a structural schematic diagram of a wireless charging base according to an embodiment of the present application.

As shown in FIGS. 4 and 5, in some embodiments, the mounting body 11 includes a mounting support part 111 and a mounting side edge 112. The upper end face of mounting support part 111 (i.e. the upper end face 1011 of mounting component 1) is used to support the automatic snow sweeping equipment 6. The mounting side edge 112 is located at the edge of the mounting support part 111 and extends downward. The support body 12 covers the mounting side edge 112. Therefore, there is a charging cavity 101 between the support body 12 and the mounting support part 111.

As shown in FIG. 3, FIG. 4 and FIG. 5, the mounting body 11 further includes a first dividing part 113 and a second dividing part 114, the first dividing part 113 and second dividing part 114 extend downward to divide the area under the mounting body 11 into a first support area 102, a charging cavity 101 and a second support area 103; the support body 12 includes a first support plate 121, a charging support plate 122 and a second support plate 123; the first support plate 121, charging support plate 122 and second support plate 123 correspondently cover the first support area 102, charging cavity 101 and second support area 103.

In some embodiments, the first dividing part 113 and the second dividing part 114 may be arranged horizontally or vertically.

Figure 9:
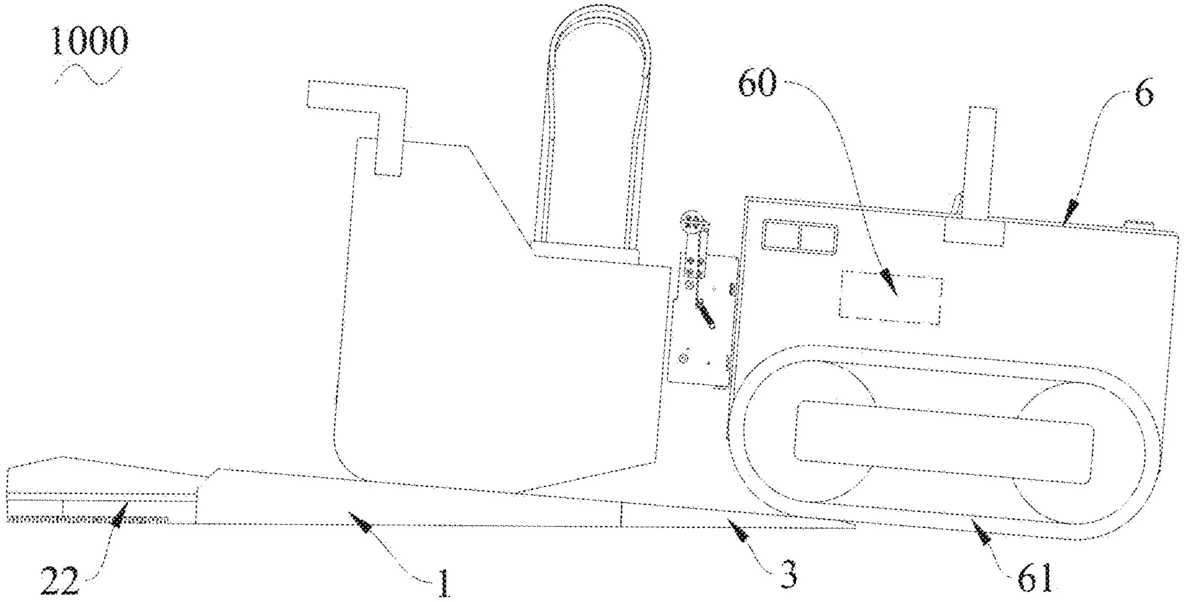
FIG. 9 is a schematic side view of a charging system according to an embodiment of the present application.

Referring to FIG. 9, in some embodiments, the first dividing part 113 and the second dividing part 114 are vertically arranged on the lower end face of the mounting support part 111, the two ends of the first dividing part 113 and the second dividing part 114 abut against the mounting side edge 112 at both ends; the first dividing part 113 and the second dividing part 114 are vertically arranged to make the first support area 102 and the second support area 103 correspond to the crawler belt 61 on both sides of the automatic snow sweeping equipment 6, respectively. When the automatic snow sweeping equipment 6 enters the mounting component 1, the crawler belts 61 on both sides of the automatic snow sweeping equipment 6 correspondingly moves directly above the first support area 102 and the second support area 103; the crawler belts 61 on both sides of the automatic snow sweeping equipment 6 are supported by the first support plate 121 and second support plate 123 respectively. In this way, the structural strength of the contact part between the automatic snow sweeping equipment 6 and mounting component 1 can be improved, which can not only ensure a good supporting effect for the automatic snow sweeping equipment 6, but also avoid excessive waste of other materials that are not in contact with the automatic snow sweeping equipment 6.

In some embodiments, the widths of the first support area 102 and the second support area 103 match with the width of the crawler belt 61 of the automatic snow sweeping equipment 6.

Figure 10:
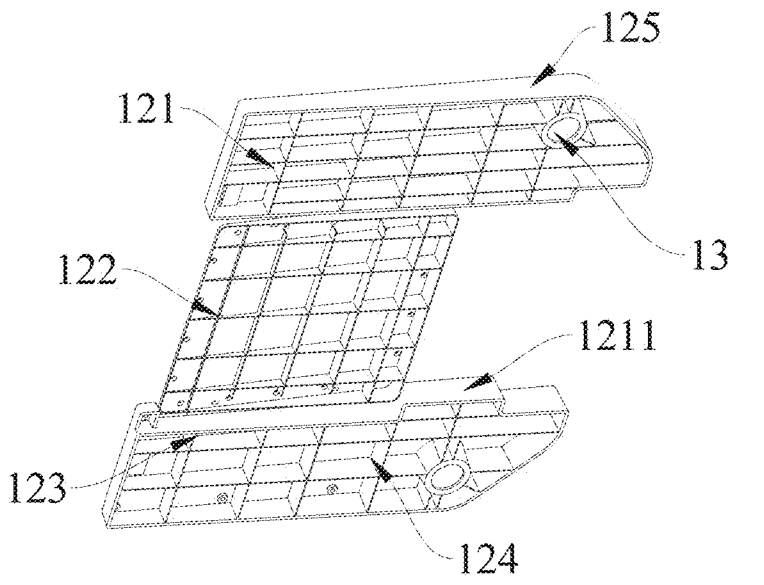
FIG. 10 is a structural schematic diagram of a part of a support body according to an embodiment of the present application.

Referring to FIG. 10, in some embodiments, the first support plate 121 and the second support plate 123 are structurally different, and the first support plate 121 or the second support plate 123 has a protrusion 1211 extending inwards. The installation errors of the first support plate 121 and the second support plate 123 can be avoided through the protrusion 1211. The first support plate 121 can be avoided from being installed at the second support area 103, or the second support plate 123 can be avoided from being installed at the first support area 102.

The first support plate 121, charging support plate 122 and second support plate 123 all include a top plate support part 124 and a side edge support part 125. The top plate support part 124 is adjacent to the mounting body 11, and the side edge support part 125 is arranged at the edge of the top plate support part 124 and extends away from the mounting body 11.

The height of the front side edge support part 125 is smaller than that of the rear side edge support part 125, so that the inclination angle of the top plate support part 124 is the same as the preset angle of the upper end face of the mounting body 11. In this way, the material of support body 12 can be reduced to save cost, the structure of the mounting component 1 can be more compact, and the structural strength of mounting component 1 can also be improved.

As shown in FIG. 8, in some embodiments, the mounting component 1 is provided with a support mounting hole 13, the support mounting hole 13 passes through the mounting body 11 and the support body 12, and the mounting component 1 can be fixed on the ground by inserting a bolt in the support mounting hole 13.

As shown in FIG. 5, in some embodiments, a mounting pattern 1111 is arranged on the upper end face of the mounting support part 111, and the position of the mounting pattern 1111 corresponds to the crawler belts 61 on both sides of the automatic snow sweeping equipment 6. The mounting pattern 1111 is used to improve the friction between the crawler belt 61 and mounting component 1 of the automatic snow sweeping equipment 6, so as to avoid the automatic snow sweeping equipment 6 from slipping off the wireless charging base 100, and avoid the automatic snow sweeping equipment 6 from slipping on the wireless charging base 100 to scratch the wireless charging base 100, thus prolonging the service life of the wireless charging base 100.

The mounting patterns 1111 are obliquely arranged, and the upper ends of the mounting patterns 1111 on the left and right sides are arranged near the middle of the mounting support part 111, and the lower end extends away from the middle of the mounting support part 111.

The charging component 2 may be wired charging type or wireless charging type. However, the wired charged component in contact with the automatic snow sweeping equipment 6 is inevitably exposed to the air, the safety is poor, and corrosion would be accelerated after contacting with water, which would easily reduce the service life.

Therefore, in some embodiments, the automatic snow sweeping equipment 6 is charged using wireless charging. As shown in FIG. 3 and FIG. 4, the charging component 2 includes a charging transmitting coil 21 and a charging control piece 22, and the charging control piece 22 is connected with the charging transmitting coil 21. The charging control piece 22 is used to control the operation of the charging transmitting coil 21, the charging transmitting coil 21 is arranged in the charging cavity 101 of the mounting component 1. The charging control piece 22 includes a charging housing 221 and a main charging control board 222, and the charging housing 221 is connected with the mounting component 1. The main charging control board 222 is arranged in the charging housing 221, and the main charging control board 222 is connected with the charging transmitting coil 21.

In the embodiment of the application, the automatic snow sweeping equipment 6 is charged in a wireless charging mode, and the charging transmitting coil 21 for charging is arranged in the mounting component 1. While the charging control piece 22 for controlling the charging of the transmitting coil 21 is set separately, so that the space occupied by the charging control piece 22 in the mounting component 1 can be reduced, the mounting component 1 can be made compact, and the structural strength of the mounting component 1 can be improved accordingly. The charging transmitting coil 21 is arranged in the mounting component 1 separately, which can provide waterproof protection for the charging transmitting coil 21 alone, and improve the waterproofing performance of the charging transmitting coil 21. Because the charging control piece 22 is also set separately, it also reduces the waterproof difficulty of the charging control piece 22. It is also beneficial to the heat dissipation of the main charging control board 222.

The charging transmitting coil 21 and the charging control piece 22 are separately arranged. During installation, the charging transmitting coil 21 is installed in the charging cavity 101 of mounting component 1. The charging control piece 22 is detachably fixed at the back of the mounting component 1 by a screw or buckle, and then the charging transmitting coil 21 is electrically connected with the main charging control board 222 by connecting wires.

The inner end of the connecting line is connected with the main charging control board 222, and the outer end of the connecting line is provided with an aviation plug 223, and the connecting line is connected with the charging transmitting coil 21 through the aviation plug 223. In this way, the disassembly and maintenance of the charging control piece 22 can be facilitated, and the installation efficiency of the wireless charging base 100 can be improved.

As shown in FIG. 4, in some embodiments, both ends of the connecting line are provided with aviation plugs 223, and the connecting line is electrically connected with the charging transmitting coil 21 and the main charging control board 222 through the aviation plugs 223 at both ends. In this way, the disassembly and maintenance of the charging control piece 22 can be facilitated, and the installation efficiency of the wireless charging base 100 can be improved.

In some embodiments, the back of the mounting component 1 is provided with a groove 14, and the front of the charging control piece 22 is clamped at the groove 14, so that the charging control piece 22 can be conveniently fixed.

In some embodiments, the length of the charging housing 221 clamping in the groove 14 is ⅙ to ½ of the overall length of the charging housing 221, so that the charging housing 221 can be conveniently fixed, and the occupied space of the charging housing 221 in the mounting component 1 can be reduced to avoid unnecessary interference to positioning and charging.

In some embodiments, the charging housing 221 is located at the lower part of the back end of mounting component 1, and the upper end face of the charging housing 221 is lower than the upper end face 1011 of mounting component 1. The charging housing 221 can support mounting component 1 and further improve the structural strength of mounting component 1.

Figure 11:
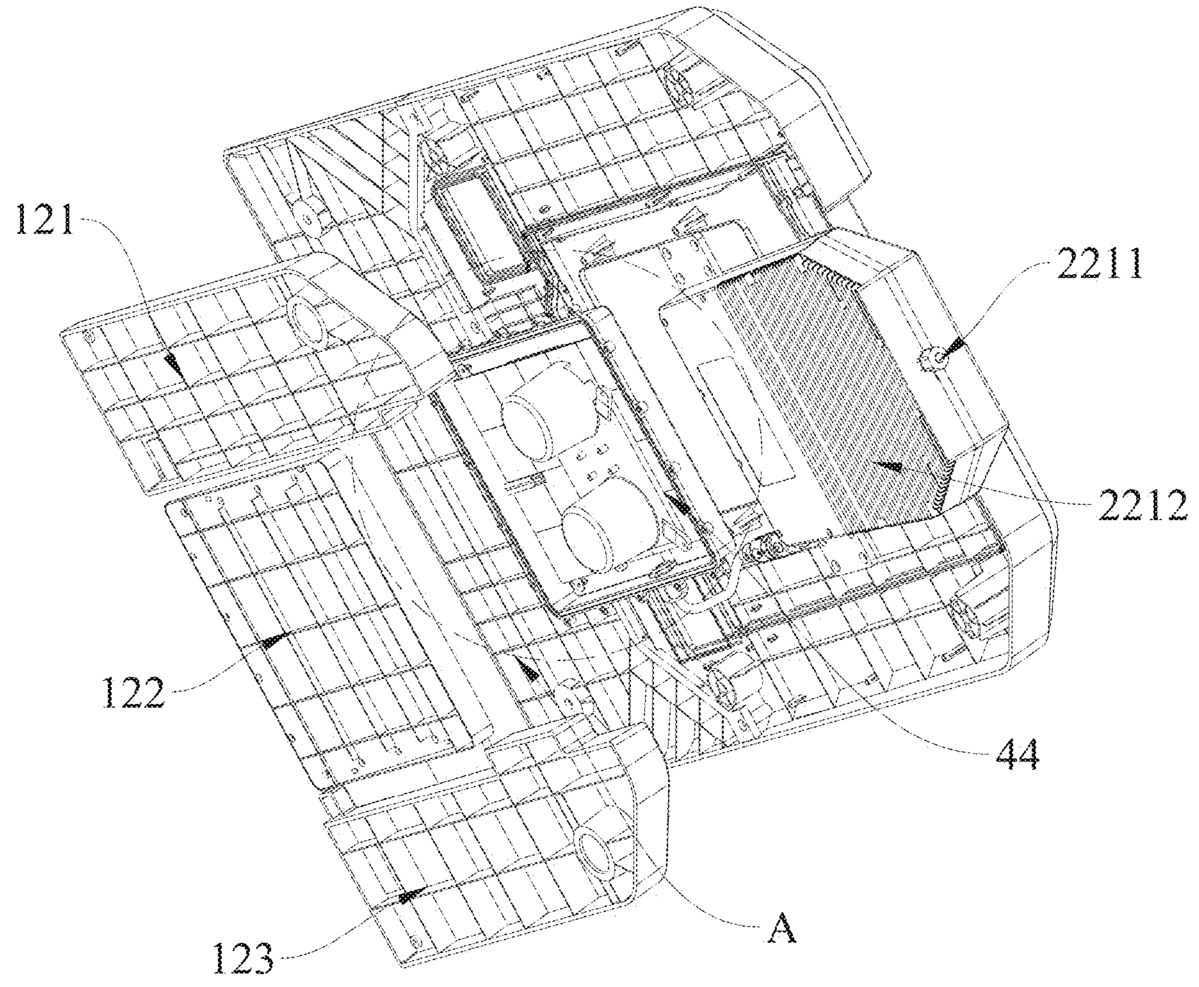
FIG. 11 is a partial structure exploded view of a charging base from another perspective according to an embodiment of the present application.

Referring to FIG. 11, in some embodiments, the back end of the charging housing 221 is provided with a waterproof joint 2211, which is used to connect a charging line, and the automatic snow sweeping equipment 6 is charged by externally connecting the charging line with commercial power. The waterproof joint 2211 may be a cable gland.

In some embodiments, the lower end face of the charging housing 221 is provided with a cooling beam 2212 for improving the heat dissipation performance of the charging housing 221.

In some embodiments, the cooling beam 2212 is a plurality of transversely evenly spaced horizontal ribs. Therefore, a good heat dissipation effect can be achieved.

In some embodiments, the area of the cooling beam 2212 accounts for ½ to ¾ of the entire bottom surface area of the charging housing 221, and it can also be understood that ½ to ¾ of the bottom surface of the charging housing 221 is provided with the cooling beam 2212. This can ensure that the charging housing 221 has a good heat dissipation effect.

In some embodiments, the charging component 2 is arranged in the charging cavity 101 of the mounting body 11. If the mounting body 11 is an integrated structure, it would occupy a large space and is not convenient for transportation. Moreover, the front part is often crushed by the automatic snow sweeping equipment 6, which is easy to be damaged, with short service life and high replacement cost.

When the automatic operation equipment or automatic snow sweeping equipment in related technology is short of power, it needs to return to the wireless charging base for charging. Because the automatic operation equipment or automatic snow sweeping equipment has a large self-weight, it will crush the wireless charging base to a certain extent. When charging, it is necessary to aim at the charging position and adjust the positioning of the automatic operation equipment or automatic snow sweeping equipment again and again, so the inlet end of the wireless charging base is more likely to be crushed and damaged. If the whole housing of the wireless charging base is replaced after the damage, it would be cumbersome and inconvenient to maintain, and it would also increase the cost of consumables and waste resources. Moreover, when the housing of the wireless charging base is integrated, it takes up a large space and is not convenient for storage and transportation.

As shown in FIG. 8, in some embodiments, the wireless charging base 100 further includes a transition piece 3, which is arranged at the front side of the mounting component 1 and detachably connected with the mounting component 1.

The transition piece 3 is arranged at the front side of mounting component 1. When the automatic snow sweeping equipment 6 enters the mounting component 1 for charging, it first enters the transition piece 3. Therefore, the direct impact of the automatic snow sweeping equipment 6 on the mounting component 1 can be avoided, the damage of the automatic snow sweeping equipment 6 to the mounting component 1 can be reduced, and the service life of the mounting component 1 can be prolonged. If the transition piece 3 is damaged, it can be disassembled and replaced directly, and it is not required to replace the mounting component 1, thus saving the cost and reducing the waste of resources. After disassembling transition piece 3 and mounting component 1, the occupied space is reduced, which is beneficial to storage and transportation and improves the convenience of storage and transportation.

The transition piece 3 can be detachably connected with the mounting component 1 by means of fastening and bonding.

Figure 12:
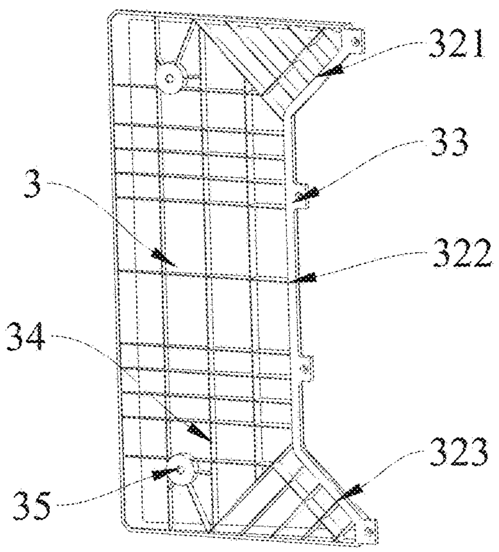
FIG. 12 is a structural schematic diagram of the bottom of a transition piece according to an embodiment of the present application.

As shown in FIG. 4 and FIG. 12, the transition piece 3 includes a top transition plate 31 and a transition side 32. The top transition plate 31 is used for supporting the automatic snow sweeping equipment 6, and the transition side 32 is arranged on the top transition plate 31 and extending downward.

The height of the front transition side 32 is smaller than that of the rear transition side 32, so that the inclination angle of the top transition plate 31 is the same as the preset angle of the upper end face of the mounting body 11.

The inclination angle of the upper end face 30 of transition piece 3 (see FIG. 2) is the same as that of the upper end face 1011 of mounting component 1. It can also be understood that the lower end face of transition piece 3 and the lower end face of mounting component 1 participate in forming the lower end face of wireless charging base 100. The upper end face of transition piece 3 forms an inclination angle α with the lower end face of wireless charging base 100, and the upper end face of mounting component 1 forms an inclination angle β with the lower end face of wireless charging base 100. The inclination angle of α and its opening direction are the same as those of β. In this way, the automatic snow sweeping equipment 6 can smoothly enter the mounting component 1 from the transition piece 3.

When the transition piece 3 is set, the height of the rear end transition side 32 is equal to the height of the front-end mounting side edge 112 of the mounting component 1. In this way, the automatic snow sweeping equipment 6 can smoothly enter the mounting component 1 from the transition piece 3.

That is, when the preset included angle 104 between the support body 12 and the mounting body 11 is 2°-15°, the inclination angle of the upper end face 30 of the transition piece 3 is 2°-15°. Therefore, the upper end face of mounting component 1 and the upper end face 30 of transition piece 3 can be a smooth straight line, so that the automatic snow sweeping equipment 6 can smoothly enter the mounting component 1 from the transition piece 3.

The shape of the rear end edge of transition piece 3 matches the shape of the front end edge of mounting component 1. Therefore, the contact tightness between the transition piece 3 and mounting component 1 can be improved.

A plurality of connecting protrusions 33 extend from the rear end of the transition piece 3 in the direction of mounting component 1, or extend from the front end of mounting component 1 in the direction of transition piece 3. It can also be understood that a plurality of connecting protrusions 33 extend from the rear end of transition piece 3 in the direction of mounting component 1, or, a plurality of connecting protrusions 33 extend from the front end of mounting component 1 in the direction towards transition piece 3, and the connecting projections 33 are used for fixedly connecting the transition piece 3 and mounting component 1. The connecting protrusion 33 is used to fixedly connect the transition piece 3 and mounting component 1. The transition piece 3 and mounting component 1 can be fixedly connected by a bolt penetrating the connecting protrusion 33.

The rear end edge of transition piece 3 includes a first bevel 321, a middle edge 322 and a second bevel 323 extending in sequence, and the first bevel 321, middle edge 322 and second bevel 323 are U-shaped with openings. The front end of the first bevel 321 extends from back to front to the second end of the back end of the first bevel 321, and the back end of the first bevel 321 is connected with the left end of the middle edge 322. The middle edge 322 extends horizontally to the right end of the middle edge 322. The right end of the middle edge 322 is connected with the back end of the second bevel 323. The second bevel 323 extends from front to back to the front end of the second bevel 323.

A transition compensating rib 34 is provided at the bottom of transition piece 3, and the transition compensating rib 34 is used to improve the strength of transition piece 3.

The transition compensating rib 34 at the first bevel 321 is perpendicular to the first bevel 321, and the transition compensating rib 34 at the second bevel 323 is perpendicular to the second bevel 323. Thereby ensuring the structural strength at the first bevel 321 and the second bevel 323.

The front end of the first bevel 321, the left and right sides of the middle edge 322 and the front end of the second bevel 323 extend out of the connecting protrusion 33. The transition piece 3 and mounting component 1 can be fixedly connected by a bolt penetrating the connecting protrusion 33.

The front of the transition piece 3 is provided with a transition fixing hole 35, and a bolt can be inserted in the transition fixing hole 35 to fix the transition piece 3 on the ground.

As shown in FIG. 5, the upper end face 30 of the transition piece 3 is provided with a transition pattern 36 for increasing the friction between the transition piece 3 and the automatic snow sweeping equipment 6.

The transition pattern 36 includes a first sub-pattern 361, which is transversely arranged at the front of the upper end face 30 of the transition piece 3. The first sub-pattern 361 can greatly improve the friction between the automatic snow sweeping equipment 6 and transition piece 3, which is convenient for the automatic snow sweeping equipment 6 to smoothly enter the transition piece 3.

The transition pattern 36 also includes a second sub-pattern 362, which is obliquely arranged at the back of the upper end face 30 of the transition piece 3. The second sub-pattern 362 matches with the corresponding mounting pattern 1111, which facilitates the automatic snow sweeping equipment 6 to smoothly enter the mounting component 1 from transition piece 3.

As shown in FIG. 3, the wireless charging base 100 further includes a beacon component 4 and a positioning component 5, or alternatively, the wireless charging base 100 includes an inductive mechanism, and the inductive mechanism includes a beacon component 4 and a positioning component 5. The beacon component 4 is arranged at the front of mounting component 1, and the positioning component 5 is arranged at the back of mounting component 1. The beacon component 4 and positioning component 5 correspond to the sensing component 60 on the automatic snow sweeping equipment 6. The sensing component 60 is used to sense the positions of the beacon component 4 and positioning component 5, and guide the automatic snow sweeping equipment 6 to move to the charging position according to the position of beacon component 4. At the charging position, the sensing component 60 corresponds to the positioning component 5, and at the charging position, the automatic snow sweeping equipment 6 is charged through the charging component 2.

When the automatic snow sweeping equipment 6 retreats and enters into the mounting component 1 for charging, the sensing component 60 adjusts the position of automatic snow sweeping equipment 6 according to the position of beacon component 4, so as to make the position of the sensing component 60 on the same straight line with the positions of beacon component 4 and positioning component 5. And then the automatic snow sweeping equipment 6 goes straight back, until the position of the sensing component 60 corresponds to the position of the positioning component 5. After the sensing component 60 senses the positioning component 5, it indicates that the automatic snow sweeping equipment 6 has arrived at the charging position, and it can be charged by charging component 2 at the charging position.

If the position of sensing component 60 is not on the same straight line as that of the beacon component 4 and positioning component 5, then the position of automatic snow sweeping equipment 6 is inaccurate. Adjustment can be made at the outer side of mounting component 1 without entering mounting component 1 and then driving out for adjustment, thus avoiding the crawler belt 61 of the automatic snow sweeping equipment 6 from repeatedly entering the mounting component 1, and improving the service life of mounting component 1.

Figure 13:
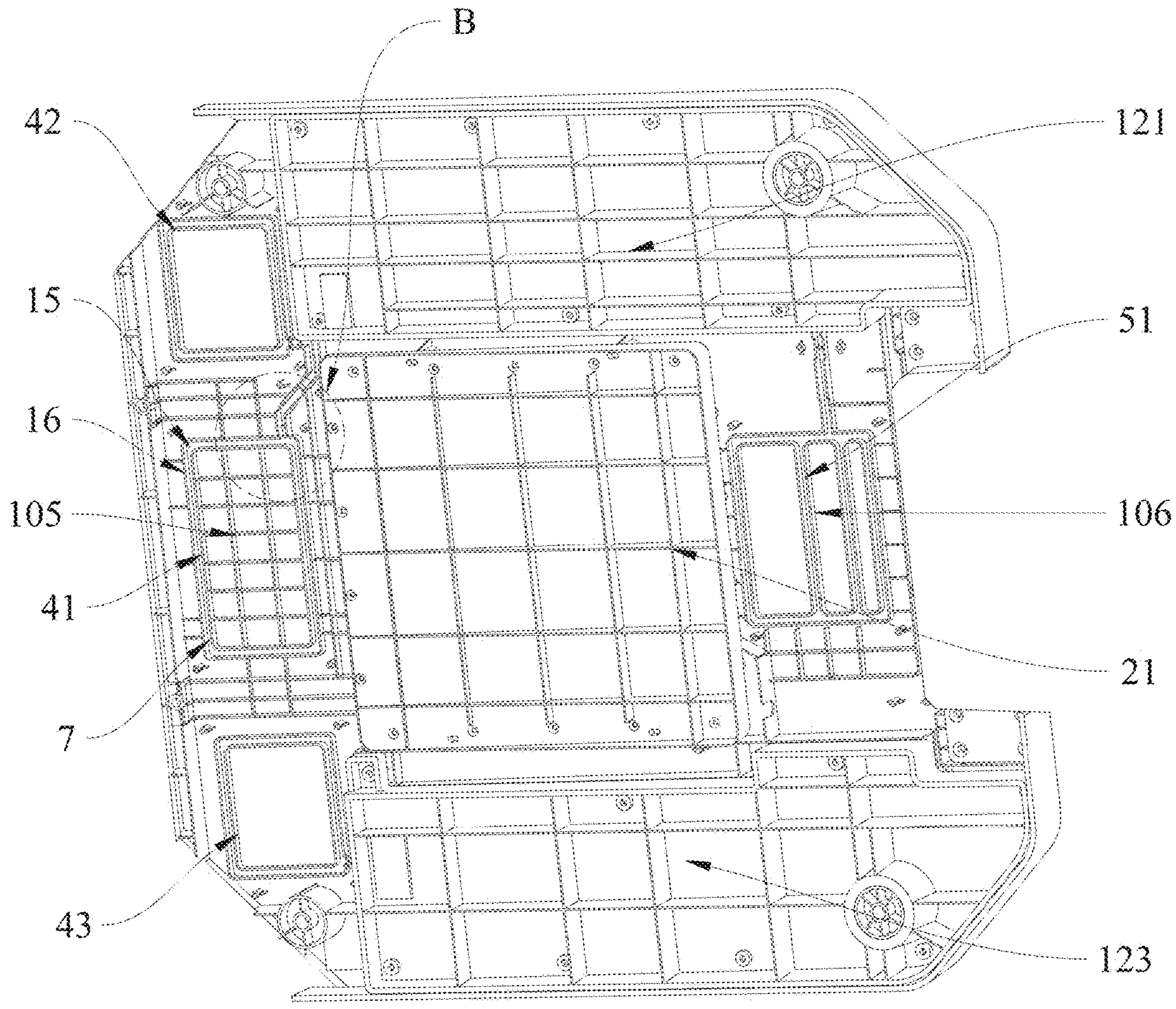
FIG. 13 is a structural schematic diagram of a part of the bottom of a mounting body according to an embodiment of the present application.

Referring to FIG. 13, in some embodiments, the front side of the mounting body 11 includes a beacon area 105, which is used to set the beacon component 4, and the back side of the mounting body 11 includes a positioning area 106, which is used to set the positioning component 5.

In some embodiments, the sensing component 60 may be an ultrasonic sensor or an infrared sensor, and the beacon component 4 and the positioning component 5 may be arranged at the protruding point or the like on the end face of the mounting component 1, and the position of the protruding point is sensed by the ultrasonic sensor or infrared sensor, so as to determine whether the position of the sensing component 60 is on the same line as that of the beacon component 4 and positioning component 5.

In some embodiments, the sensing component 60 is a magnetic induction element, and the beacon component 4 and positioning component 5 are inductance coils. When the inductance coils are energized, the magnetic induction element on the automatic snow sweeping equipment 6 detect the magnetic field generated by the inductance coil, so the position of the automatic snow sweeping equipment 6 is determined by the magnetic field.

In some embodiments, the wireless charging base 100 may further include a stopper 7, which is arranged on the end face of the mounting component 1 adjacent to the ground. The stopper 7 is used for limiting the position and fixing the inductance coil, and the inductance coil is arranged at the stopper 7. The inductance coil is used to guide the automatic operation equipment to move to the charging position, where the automatic operation equipment is charged through the charging component 2. The automatic operation equipment may be the automatic snow sweeping equipment 6. In some embodiment, that executable functions of the automatic operation equipment are one or more of clearing snow, mowing grass, spreading salt and clearing fallen leaves.

In one embodiment of the application, the stopper 7 is arranged on the end face of the mounting component 1 near the ground. When the position of the stopper 7 is determined, the inductance coil may be correspondingly arranged on the stopper 7, and the position of the inductance mechanism (such as the inductance coil) can be accurately determined through the stopper 7, so that the installation efficiency of the inductance coil is improved, the fixing effect of the inductance mechanism is improved, and the inductance mechanism is prevented from loosening and/or slipping from the wireless charging base 100, so that the wireless charging base 100 can stably charge the automatic operation equipment.

In some embodiments, the stopper 7 may be a buckle matched with the inductance coil, and the buckle may be arranged on the end face of the mounting component 1 adjacent to the ground at intervals, and then the inductance coil may be clamped on the buckle.

Figure 17:
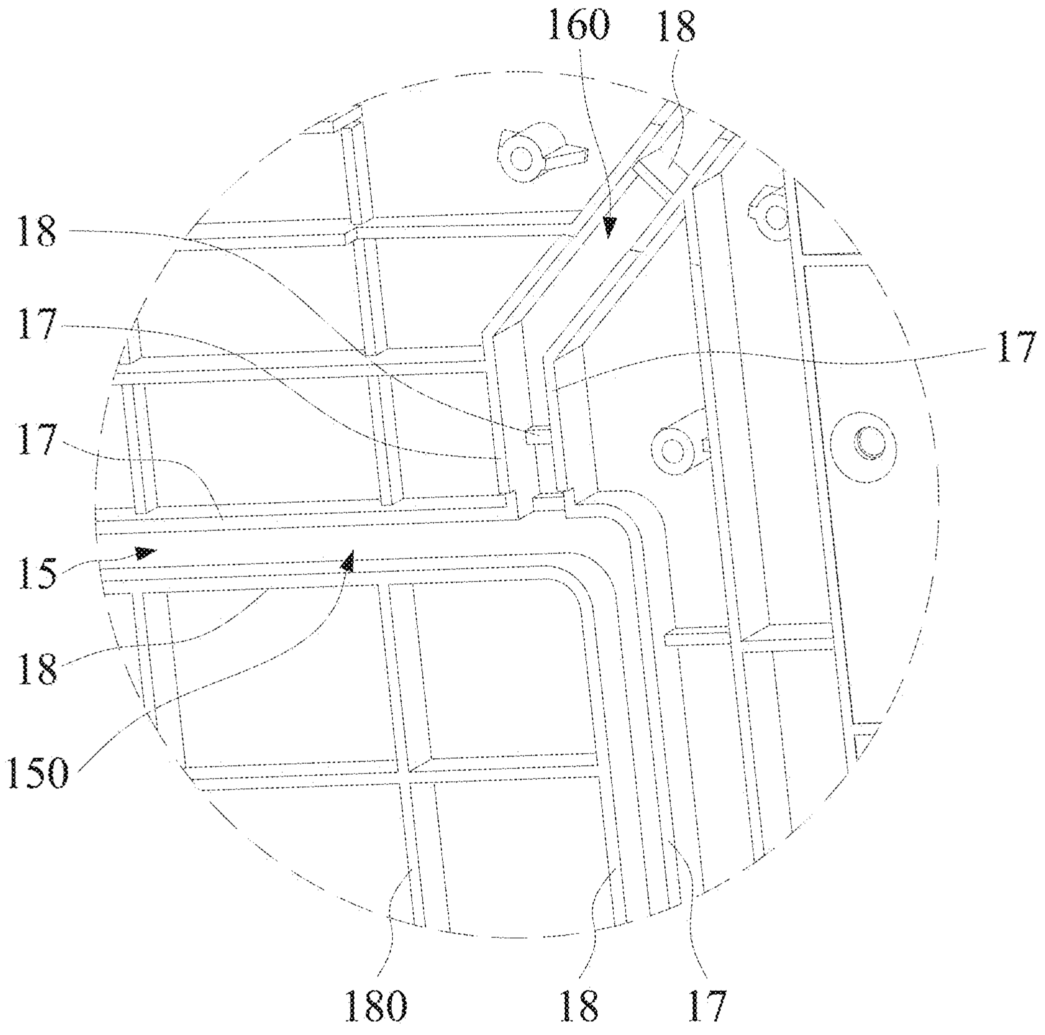
FIG. 17 is an enlarged schematic view of B in FIG. 13.

Referring to FIG. 13 and FIG. 17, in some embodiments, the stopper 7 includes a limit groove 15, which is arranged on the end face of the mounting component 1 near the ground, and the inductance coil is clamped in the limit groove 15. The limit groove 15 matches with the inductance coil, the inductance coil is clamped correspondingly at the limit groove 15, and the inductance coil is fixed and limited by the limit groove 15.

In some embodiments, the limit groove 15 may be a groove opened on the mounting component 1. In other embodiments, a limit protrusion 16 extends from the lower end face of the mounting component 1, and a limit groove 15 is formed on the limit protrusion 16. The structural strength of mounting component 1 can be improved through the limit protrusion 16. The limit protrusion 16 is filled with sealant, which is used to seal the charging transmitting coil 21. Thereby improving the waterproof protection of charging transmitting coil 21.

Figure 16:
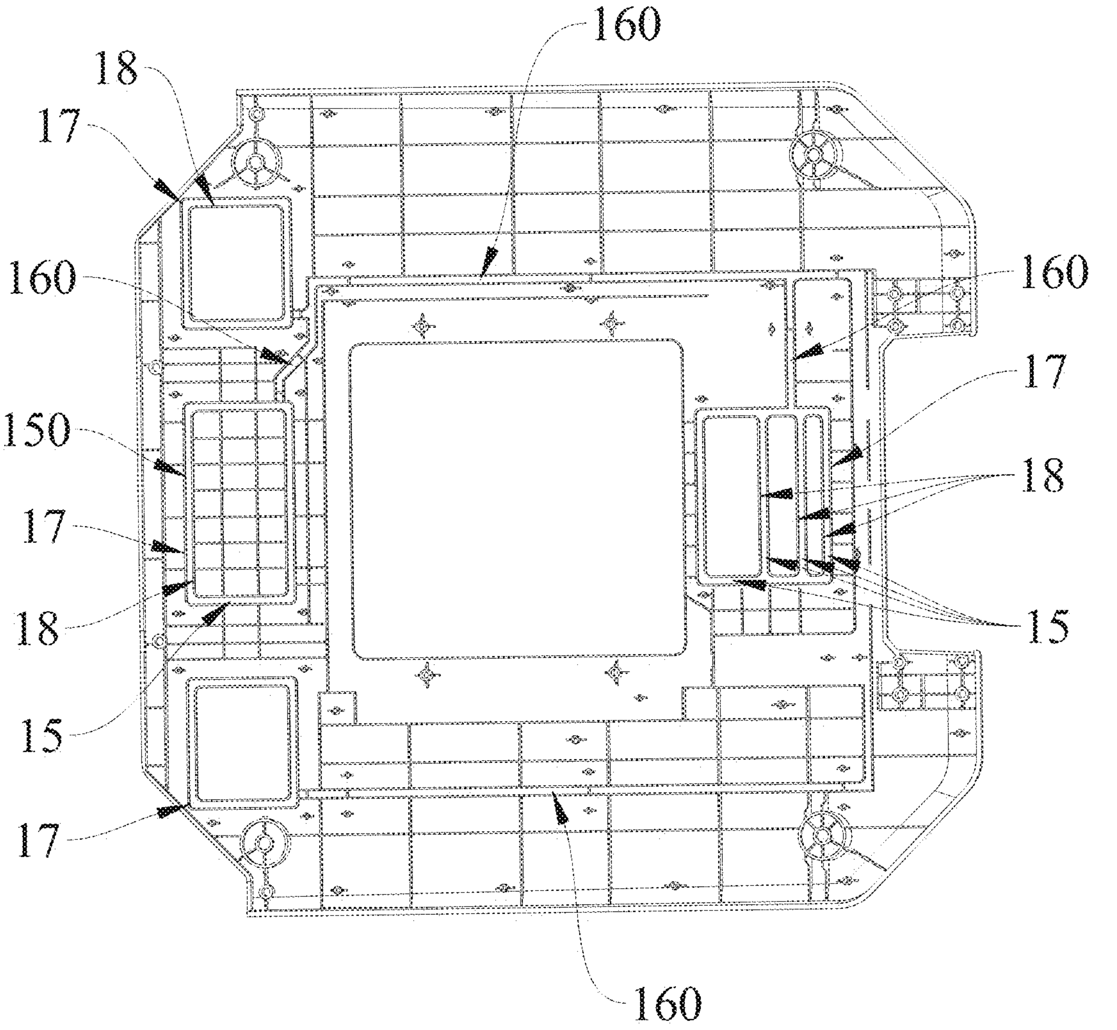
FIG. 16 is a structural schematic diagram of the bottom of a mounting body according to an embodiment of the present application.

Referring to FIG. 16, in some embodiments, the stopper 7 includes an outer layer protrusion 17 and an inner layer protrusion 18 which are arranged at intervals transversely. The outer layer protrusion 17 and inner layer protrusion 18 are arranged on the end face of mounting component 1 near the ground and extend away from mounting component 1. The outer layer protrusion 17 and inner layer protrusion 18 are enclosed to form the limit groove 15. This can ensure that mounting component 1 has high structural strength.

In some embodiments, as shown in FIG. 13, FIG. 16 and FIG. 17, a plurality of inner layer protrusions 18 are arranged in the outer layer protrusion 17 in the positioning area 106. The space enclosed between the outer layer protrusion 17 and the inner layer protrusion 18 and the space between the adjacent inner layer protrusions 18 are enclosed to form a plurality of limit grooves 15. And the plurality of limit grooves 15 are used for defining different positions of the inductance coil in the same outer layer protrusion 17. The inductance coil can surround the periphery of one inner layer protrusion 18 or a plurality of inner layer protrusions 18. Therefore, inductance coils with different shapes, sizes and positions can be flexibly provided according to the inner layer protrusion 18 at different positions.

In some embodiments, as shown in FIG. 16, the area enclosed by the outer layer protrusion 17 and the inner layer protrusion 18 includes a limit area 150 and an extension area 160, and the extension area 160 extends outward from the edge of the limit area 150. The limit area 150 is used to limit the coverage area of the inductance coil, and the extension area 160 is used to guide the inductance coil to the limit area 150. The inductance coil is surrounded by the extension area 160 and set in the limit area 150, and then returns to the extension area 160. Therefore, the structure of mounting component 1 can be made compact, and the mounting component 1 can be ensured to have high structural strength. The extension area 160 corresponding to beacon component 4, and the extension area 160 corresponding to positioning component 5 are aggregated to further improve the compactness of mounting component 1 structure.

The heights of the outer layer protrusion 17 and inner layer protrusion 18 in the extension area 160 are greater than those of the outer layer protrusion 17 and inner layer protrusion 18 in the limit area 150. Therefore, the exposure of the inductance coil in the extension area 160 can be prevented. The limit area 150 is rectangular and the extension area 160 is strip. A compensating rib 180 is arranged in the area enclosed by the inner layer protrusion 18. Therefore, the structural strength of mounting component 1 can be improved.

Referring to FIGS. 3 and 9, in some embodiments, the sensing component 60 includes a first magnetic induction element, the beacon component 4 includes a first beacon inductance coil 41. The positioning component 5 includes a first positioning inductance coil 51. And the first magnetic induction element first senses the positions of the first beacon inductance coil 41 and the first positioning inductance coil 51, so as to move to the charging position.

In some embodiments, the sensing component 60 includes a first magnetic induction element and a second magnetic induction element, which are transversely arranged side by side, the beacon component 4 includes a first beacon inductance coil 41, and the positioning component 5 includes the first positioning inductance coil 51. After the first magnetic induction element and second magnetic induction element both sense the first beacon inductance coil 41, the automatic snow sweeping equipment 6 moves back to the first positioning inductance coil 51. After the first magnetic induction element and second magnetic induction element both sense the first positioning inductance coil 51, it indicates that the automatic snow sweeping equipment 6 has arrived at the charging position, and then the charging component 2 can be started to charge the automatic snow sweeping equipment 6.

When the first magnetic induction element and second magnetic induction element both sense the first beacon inductance coil 41, it indicates that the first magnetic induction element and second magnetic induction element are close to the first beacon inductance coil 41. At this point, the automatic snow sweeping equipment 6 is also facing the wireless charging base 100, rather than deviating. This avoids the situation that when there is only a single magnetic induction element, beacon component 4 (inductance coil) and positioning component 5 (inductance coil), the automatic snow sweeping equipment 6 may be deviated and cannot reach the charging position efficiently. In this way, the positioning accuracy is increased, the positioning time cost of the automatic snow sweeping equipment 6 is reduced, and the positioning efficiency is improved.

When the first magnetic induction element and second magnetic induction element both sense the first beacon inductance coil 41, the automatic snow sweeping equipment 6 moves straight back. When the first magnetic induction element and the second magnetic induction element both sense the first positioning inductance coil 51, it indicates that the automatic snow sweeping equipment 6 has arrived at the charging position, and it can be charged by charging component 2 at the charging position.

The first beacon inductance coil 41 and first positioning inductance coil 51 can be designed as different shapes, such as rectangular, circular, polygonal or arranged side by side.

The first beacon inductance coil 41 and the first positioning inductance coil 51 are rectangular and arranged side by side in the mounting component 1.

The lengths of the first beacon inductance coil 41 and first positioning inductance coil 51 are greater than or equal to the length between the first magnetic induction element and second magnetic induction element. Therefore, both the first magnetic induction element and second magnetic induction element can induce the first beacon inductance coil 41 and first positioning inductance coil 51. The length between the first magnetic induction element and second magnetic induction element is the length between the center of the first magnetic induction element and the center of the second magnetic induction element.

The beacon component 4 also includes a second beacon inductance coil 42 and a third beacon inductance coil 43. The second beacon inductance coil 42 and third beacon inductance coil 43 are used to correct the position of automatic snow sweeping equipment 6. The second beacon inductance coil 42 and third beacon inductance coil 43 are located on both sides of first positioning inductance coil 51, the second beacon inductance coil 42 and third beacon inductance coil 43 are arranged side by side with first positioning inductance coil 51.

The magnetic field intensities of the first beacon inductance coil 41, second beacon inductance coil 42 and third beacon inductance coil 43 are different. Therefore, the first magnetic induction element and second magnetic induction element can judge which inductance coil is sensed. Thereby quickly adjusting the position of automatic snow sweeping equipment 6. For example, the first magnetic induction element is located on the left side of automatic snow sweeping equipment 6, and the second magnetic induction element is located on the right side of automatic snow sweeping equipment 6. The second beacon inductance coil 42, first beacon inductance coil 41 and third beacon inductance coil 43 are arranged from left to right. When only the second magnetic induction element senses the second beacon inductance coil 42, it indicates that the position of automatic snow sweeping equipment 6 is inclined to the left, which needs to be adjusted to the right. When the first magnetic induction element senses the second beacon inductance coil 42 and the second magnetic induction element senses the first beacon inductance coil 41, it also indicates that the position of automatic snow sweeping equipment 6 is inclined to the left, which needs to be adjusted to the right. When the first magnetic induction element and the second magnetic induction element both sense the first beacon inductance coil 41, it indicates that the position of the automatic snow sweeping equipment 6 is facing the wireless charging base 100. So the position of the automatic snow sweeping equipment 6 simply needs to move back to the charging position. When the first magnetic induction element senses the first beacon inductance coil 41 and the second magnetic induction element senses the third beacon inductance coil 43, it indicates that the position of automatic snow sweeping equipment 6 is inclined to the right, which needs to be adjusted to the left. When only the first magnetic induction element senses the third beacon inductance coil 43, it also indicates that the position of automatic snow sweeping equipment 6 is inclined to the right, which needs to be adjusted to the left. Therefore, the position of the automatic snow sweeping equipment 6 can be adjusted efficiently according to the inductance coil sensed by the first magnetic induction element and the second magnetic induction element. In this way, the positioning accuracy is increased, the positioning time cost of the automatic snow sweeping equipment 6 is reduced, and the positioning efficiency is improved.

The second beacon inductance coil 42 and third beacon inductance coil 43 are rectangular, and the lengths of the second beacon inductance coil 42 and third beacon inductance coil 43 are greater than or equal to the sizes of the first magnetic induction element and second magnetic induction element. The second beacon inductance coil 42 and third beacon inductance coil 43 are adopted to make the first magnetic induction element and the second magnetic induction element sense positions in advance without covering both the first magnetic induction element and second magnetic induction element, thereby reducing the waste of materials.

Referring to FIG. 13, the lower end face of the mounting component 1 is provided with a limit protrusion 16, which is matched with the first beacon inductance coil 41, second beacon inductance coil 42, third beacon inductance coil 43 and the first positioning inductance coil 51. The limit protrusion 16 is provided with a limit groove 15, a first beacon inductance coil 41, a second beacon inductance coil 42, a third beacon inductance coil 43 and a first positioning inductance coil 51, which are clamped in the limit groove 15 correspondently. With the limit protrusion 16, the first beacon inductance coil 41, second beacon inductance coil 42, third beacon inductance coil 43 and first positioning inductance coil 51 are used for limiting and fixing, so as to prevent the first beacon inductance coil 41, second beacon inductance coil 42, third beacon inductance coil 43 and first positioning inductance coil 51 from slipping out.

Figure 14:
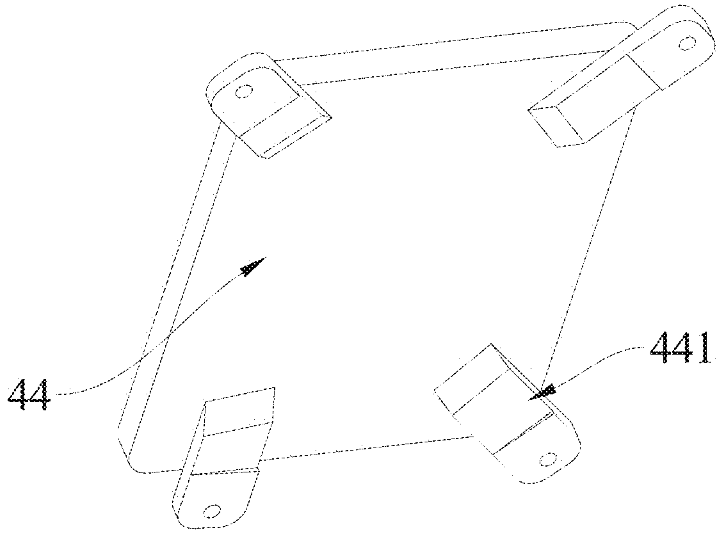
FIG. 14 is a structural schematic diagram of a cover plate according to an embodiment of the present application.

Referring to FIG. 3 and FIG. 14, the lower part of the mounting component 1 is provided with a cover plate 44. The cover plate 44 covers the periphery of the first beacon inductance coil 41, second beacon inductance coil 42, third beacon inductance coil 43 and first positioning inductance coil 51.

The underside of the mounting component 1 at the four corners of the cover plate 44 is provided with a pressing plate 441, which is rotatably connected with the mounting component 1 through a rotating shaft. The pressing plate 441 can rotate relative to the mounting component 1, and when the pressing plate 441 rotates to be on the cover plate 44, it fixedly supports the cover plate 44. Therefore, it is convenient to maintain the first beacon inductance coil 41, second beacon inductance coil 42, third beacon inductance coil 43 and first positioning inductance coil 51.

The positioning inductance coil is aligned with the first beacon inductance coil 41. When the first magnetic induction element and second magnetic induction element are within the coverage range of the first beacon inductance coil 41, the automatic snow sweeping equipment 6 moves straight back and corresponds to the positioning inductance coil. When both the first magnetic induction element and second magnetic induction element detect the positioning inductance coil, it indicates that the charging transmitting coil 21 on the wireless charging base 100 is coupled with the charging receiving coil on the automatic snow sweeping equipment 6. After the charging transmitting coil 21 is coupled with the charging receiving coil on the automatic snow sweeping equipment 6, the automatic snow sweeping equipment 6 is stopped. The automatic snow sweeping equipment 6 can be charged by the charging transmitting coil 21 and the charging receiving coil on the automatic snow sweeping equipment 6.

Figure 15:
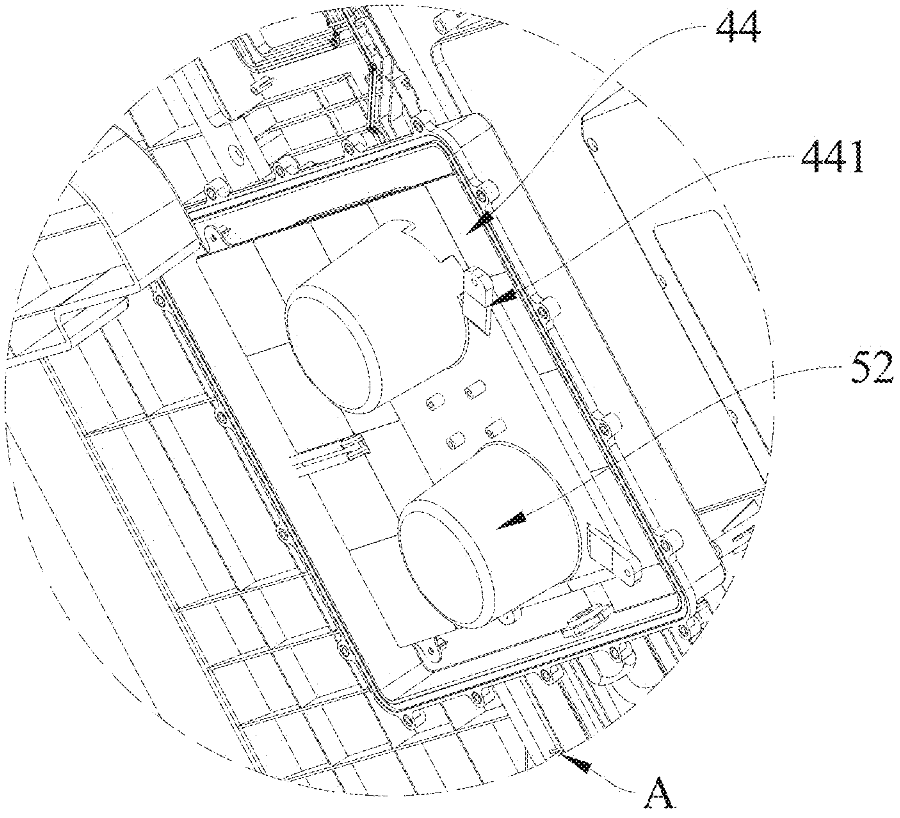
FIG. 15 is an enlarged structural diagram of a support block of A in FIG. 11.

As shown in FIG. 15, a support block 52 is arranged on the cover plate 44 at the positioning inductance coil, and the support block 52 is used for supporting the mounting component 1. Thus improving the compressive strength of mounting component 1. The support block 52 is cylindrical, and the lower end face of the support block 52 is in contact with the ground, so that the supporting force at the positioning inductance coil is improved through the support block 52, the damage of the mounting component 1 is avoided, and the service life of the mounting component 1 is prolonged.

The above are merely embodiments, which do not limit the patent scope of this application. Any equivalent structural transformation made with the contents of this application specification and attached drawings, or directly or indirectly applied to other related technical fields, are included in the patent protection scope of this application.

The invention claimed is:

1. A wireless charging base for charging an automatic operation equipment, the wireless charging base comprising:

a mounting component, wherein:

the mounting component has a first end face and a second end face opposite the first end face, the first end face of the mounting component being configured to support the automatic operation equipment, and the second end face of the mounting component being configured to be positioned on a ground support surface, the first end face of the mounting component and a support surface of the wireless charging base are arranged at an included angle, the support surface of the wireless charging base including the second end face, and the mounting component comprises a charging position, the automatic operation equipment being configured to be charged at the charging position;

a positioning component arranged on the mounting component, the positioning component being configured to guide the automatic operation equipment to the charging position;

a stopper arranged on the second end face of the mounting component, wherein the stopper comprises a limit groove and is configured to retain the positioning component within the limit groove to prevent the positioning component from moving relative to the second end face of the mounting component; and a charging component, wherein the charging component is arranged on the mounting component and configured to charge the automatic operation equipment.

2. The wireless charging base of claim 1, wherein the stopper further comprises an outer layer protrusion and an inner layer protrusion defining the limit groove.

3. The wireless charging base of claim 2, wherein the positioning component is clamped in the limit groove.

4. The wireless charging base of claim 1, comprising a beacon component configured to guide the automatic operation equipment toward the mounting component, wherein the beacon component is arranged on a side of the mounting component where the automatic operation equipment initiates movement toward the mounting component.

5. The wireless charging base of claim 1, wherein the positioning component comprises an inductance coil.

6. The wireless charging base of claim 1, comprising a transition piece detachably connected with a side of the mounting component, wherein the transition piece is configured to guide the automatic operation equipment to move from the transition piece to the mounting component.

7. The wireless charging base of claim 6, wherein an inclination angle of an upper end face of the transition piece is the same as the included angle.

8. The wireless charging base of claim 1, wherein the included angle is no greater than 15°.

9. The wireless charging base of claim 1, wherein a minimum height of the first end face of the mounting component relative to the ground support surface is less than 10 millimeters.

10. The wireless charging base of claim 1, wherein the mounting component further comprises a first support area and a second support area vertically arranged to correspond to crawler belts on opposite sides of the automatic operation equipment.

11. The wireless charging base of claim 1, wherein:

the charging component comprises a charging transmitting coil and a charging control piece, and the charging control piece is separately set from the charging transmitting coil to reduce occupied space in the mounting component.

12. The wireless charging base of claim 1, wherein the automatic operation equipment is configured for at least one of clearing snow, mowing grass, spreading salt, and clearing leaves.

13. A system, comprising:

an automatic operation equipment comprising a sensing component; and a wireless charging base for charging the automatic operation equipment, the wireless charging base comprising:

a mounting component, wherein:

the mounting component has a first end face and a second end face opposite the first end face, the first end face of the mounting component being configured to support the automatic operation equipment, and the second end face of the mounting component being configured to be positioned on a ground support surface, the first end face of the mounting component and a support surface of the wireless charging base are arranged at an included angle, the support surface of the wireless charging base including the second end face, and the mounting component comprises a charging position, the automatic operation equipment being configured to be charged at the charging position;

a positioning component arranged on the mounting component, the positioning component being configured to provide a positioning signal detectable by the sensing component to guide the automatic operation equipment to the charging position;

a stopper arranged on the second end face of the mounting component, wherein:

the stopper comprises a limit groove, and the stopper is configured to retain the positioning component within the limit groove to prevent the positioning component from moving relative to the second end face of the mounting component; and a charging component, wherein the charging component is arranged on the mounting component and configured to charge the automatic operation equipment at the charging position.

14. The system of claim 13, wherein:

the automatic operation equipment comprises a crawler belt configured to move along the first end face of the mounting component, and the mounting component comprises at least one dividing part defining a support area having a width matching a width of the crawler belt.

15. The system of claim 13, comprising a beacon component arranged on an entry side of the mounting component, wherein the automatic operation equipment is configured to align with the mounting component based on a signal from the beacon component prior to being guided by the positioning signal.

16. The system of claim 13, wherein the sensing component of the automatic operation equipment comprises at least one of a magnetic induction element, an infrared sensor, or an ultrasonic sensor configured to detect the positioning signal from the positioning component.

17. A method for charging an automatic operation equipment using a wireless charging base, the wireless charging base comprising a mounting component, a positioning component, a stopper, and a charging component, the method comprising:

guiding the automatic operation equipment across a first end face to a charging position of the mounting component based on a signal from the positioning component, wherein:

the mounting component has the first end face and a second end face opposite the first end face, the first end face of the mounting component being configured to support the automatic operation equipment, and the second end face of the mounting component being configured to be positioned on a ground support surface, the first end face of the mounting component and a support surface of the wireless charging base are arranged at an included angle, the support surface of the wireless charging base including the second end face of the mounting component, and the stopper is arranged on the second end face of the mounting component, the stopper comprising a limit groove and configured to constrain the positioning component within the limit groove to prevent the positioning component from moving relative to the second end face of the mounting component; and charging the automatic operation equipment through the charging component at the charging position.

18. The method of claim 17, comprising:

retaining the positioning component within the limit groove, the limit groove being defined by an outer layer protrusion and an inner layer protrusion arranged on the second end face of the mounting component.

19. The method of claim 17, comprising:

supporting the automatic operation equipment as it moves from a transition piece onto the first end face of the mounting component, wherein the transition piece and the first end face form an inclined surface at the included angle.

20. The method of claim 17, wherein the guiding the automatic operation equipment comprises:

detecting a magnetic field generated by an inductance coil of the positioning component using a magnetic induction element arranged on the automatic operation equipment.

* * * * *